US007735663B2

(12) United States Patent
Tanaka et al.

(10) Patent No.: US 7,735,663 B2
(45) Date of Patent: Jun. 15, 2010

(54) NECK OF A SYNTHETIC RESIN BOTTLE

(75) Inventors: Toshimasa Tanaka, Tokyo (JP); Takao Iizuka, Tokyo (JP); Yukio Koshidaka, Matsudo (JP); Kazuhiko Shimizu, Matsudo (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 1022 days.

(21) Appl. No.: 10/579,496

(22) PCT Filed: Jan. 25, 2005

(86) PCT No.: PCT/JP2005/000883

§ 371 (c)(1),
(2), (4) Date: Jun. 28, 2006

(87) PCT Pub. No.: WO2005/073096

PCT Pub. Date: Aug. 11, 2005

(65) Prior Publication Data

US 2007/0158294 A1    Jul. 12, 2007

(30) Foreign Application Priority Data

Jan. 30, 2004   (JP)   ............................ 2004-024304
Jan. 30, 2004   (JP)   ............................ 2004-024626

(51) Int. Cl.
*B65D 1/46*    (2006.01)
*B65D 1/02*    (2006.01)

(52) U.S. Cl. .............................. 215/44; 215/42; 215/45; 220/288

(58) Field of Classification Search ................... 215/40, 215/42–45, 332; 220/288, 296
See application file for complete search history.

(56) References Cited

U.S. PATENT DOCUMENTS

| 5,307,946 | A | * | 5/1994 | Molinaro | 215/329 |
| 6,006,930 | A | | 12/1999 | Dreyer et al. | |
| 6,044,992 | A | * | 4/2000 | Ma | 215/44 |
| 6,105,802 | A | * | 8/2000 | French et al. | 215/318 |
| 6,626,324 | B1 | | 9/2003 | Boyd | |
| 6,659,297 | B2 | * | 12/2003 | Gregory et al. | 215/252 |
| 7,097,056 | B2 | * | 8/2006 | Ozawa et al. | 215/44 |
| 2002/0148800 | A1 | | 10/2002 | Ozawa et al. | |

FOREIGN PATENT DOCUMENTS

| JP | A 10-58527 | 3/1998 |
| JP | A 2000-503944 | 4/2000 |
| JP | A 2002-53117 | 2/2002 |

* cited by examiner

*Primary Examiner*—Sue A Weaver
(74) *Attorney, Agent, or Firm*—Oliff & Berridge, PLC.

(57) ABSTRACT

A resource-saving neck of a synthetic resin bottle having high resistance to pressure and heat and a high, stable sealing property is provided. The part is aimed at equalizing an effect of thread-formed portions on the crystallization of a molten resin material along the circumferential direction of the part. These objectives are achieved by (1) forming screw threads of a multi-threaded screw structure on the outer surface of the neck wall, each screw thread comprising a main thread, with a starting and ending extension, with a width and height thereof being reduced gradually; (2) disposing the starting extension of a screw thread vertically above the ending extension of another thread; and (3) whitening the entire part by thermal crystallization. Sinks are prevented in the neck wall, and the height can be restricted despite increase in the diameter.

8 Claims, 9 Drawing Sheets

NECK OF A SYNTHETIC RESIN BOTTLE

TECHNICAL FIELD

This invention relates to a neck of a synthetic resin bottle that is drawn and blow molded from a synthetic resin material, and in particular, to the structure of a neck that has pressure tightness, heat resistance, and a high, stable sealing property and shows a resource saving advantage.

BACKGROUND ART

The neck of a bottle is given high heat resistance and rigidity by whitening the neck in the thermal crystallization treatment. Such a neck is used for the synthetic resin bottle to be filled with tea, fruit juice, liquid seasoning, retort-packed food and the like at a high temperature or to be subjected to an intermediate process, such as a thermal sterilization process, and is used especially for the biaxially drawn, blow-molded bottle made of a polyethylene terephthalate resin (hereinafter referred to as PET bottle). (See Patent Document 1.)
[Patent Document 1]: Application No. 1998-058527

A multi-threaded screw structure is adopted to shortcut the rotating movement required to fit or remove the screw cap or to reduce the amount of synthetic resin material required to mold a neck. The multi-threaded screw structure is utilized, especially for most of wide-mouth bottles, so that the neck does not become too tall.

In most cases, the cap screwed on the PET bottle is not an aluminum pilfer-proof cap that requires large screwing strength, but a synthetic resin pilfer-proof cap that does not require much strength. The neck of a PET bottle can have the wall thickness and bead ring size that are smaller than those used in the case where the aluminum pilfer-proof cap is put on. Thus, the synthetic resin pilfer-proof cap gives a higher resource saving effect.

As shown in the rolled-out view of FIG. 11, the neck in the conventional art is provided with a number of screw threads 30, which amount to three in FIG. 8, and these threads 30 are disposed at an equal central angle on the outer surface of round neck wall 2. Each main thread 40 primarily carries out the screwing function of each screw thread 30. The anterior half of the main thread 40 of a screw thread 30 is located above the posterior half of a neighboring screw thread 30. In turn, the posterior half of the main thread 40 of the first screw thread 30 is located beneath the anterior half of the main thread 40 of still another screw thread 30.

Each screw thread 30 is provided with a starting portion 50 at the start of the main thread 40 and an ending portion 60 at the end of the main thread 40. This starting portion 50 has reduced dimensions for smooth screw engagement and release from the mold. The ending portion 60 too has reduced dimensions for smooth release from the mold.

The main thread 40 of a screw thread 30 is located above the main thread 40 of another screw thread 30 in a main zone that performs the screwing function. Between a main zone and another neighboring main zone there is an auxiliary zone that helps the main zones perform the screwing function. This auxiliary zone includes a starting portion 50 of a screw thread 30, an ending portion 60 of another screw thread 30, and a part of the main thread 40 of still another screw thread 30.

The screw engagement between the neck and a screw cap is achieved in the main zones, which are equally spaced in the circumferential direction and in which the above-described screwing function is performed. On the other hand, the above-described auxiliary zones do not need to accept large screwing and fitting force. Therefore, the starting portion 50 and the ending portion 60 of these screw threads 30 are molded in sizes as small as possible within a range in which mold release and screw engagement can be achieved smoothly.

DISCLOSURE OF THE INVENTION

Problem to be Solved by the Invention

The above-described conventional art had a problem in that there occurs contractile deformation, causing sinks (h) (See FIG. 11) in the top end face of the round neck wall 2 and thus giving damage to the sealing property of the neck. This contractile deformation was incurred by the thermal crystallization treatment conducted under conditions of decreased thickness of the round neck wall 2, a large reduction in dimensions, especially height and width, of the bead ring 7, and a high temperature of about 180° C. used to obtain heat resistance that makes the bottle usable as the container of retort-packed foods.

For example, in the case shown in FIG. 11, it was confirmed that there occurred large sinks (h) (actually having the size in the order of a tenth of 1 millimeter, but was shown in FIG. 11 in an enlarged view for easiness to understand) in the area covering the central angle position in the range of 20 to 40 degrees toward the screwing direction from the auxiliary screwing zone.

It is believed that these sinks (h) have occurred because of decreased thickness of the round neck wall 2 and a large reduction in dimensions, especially height and width, of the bead ring 7. Under these conditions, the flow of molten PET is affected by the thread-formed portions at the time when the neck is injection molded, causing a difference in the degree of the molecular orientation. This difference has a large effect on the uniform thermal crystallization treatment of the entire neck, and creates a large difference in the degree of crystallization among various portions of the neck.

This invention has been made to solve the above-described problem found in conventional art. The technical problem of this invention is to equalize the effect of thread-formed portions on the molecular orientation of the molten resin material as much as possible along the circumferential direction of the neck. The object of this invention is to obtain a resource-saving neck having high resistance to pressure and heat and high, stable sealing property.

Means of Solving the Problem

In the following description, the main thread zone is defined as a circumferentially extending zone of the neck where at least two main threads are disposed, with one thread laid above the other. The thread extension zone is defined as a circumferentially extending zone of the neck where at least one starting extension of a screw thread is disposed above the ending extension of another screw thread.

An exemplary means of carrying out the solution of the above-described technical problem is a neck of a synthetic resin bottle comprising a round neck wall and multiple screw threads of a multi-threaded screw structure disposed on the outer surface of the round neck wall, each screw thread comprising a main thread in charge of a screwing function, a starting extension extending from a main thread start point of the main thread with width and height thereof being reduced gradually from the dimensions of said main thread and an ending extension extending from a main thread end point of the main thread with width and height thereof being reduced gradually from the dimensions of said main thread, wherein the starting extension of a screw thread is vertically disposed above the ending extension of another thread, with both extensions in the same length, and wherein the neck is entirely whitened by thermal crystallization.

The sinks or dents caused by thermal crystallization in the top end face of the conventional neck must have developed presumably in the following mechanism: An injection-molded preform in a test-tube shape is used for biaxial drawing and blow molding. In the injection molding operation, a molten resin is injected into the mold through the preform bottom position and is allowed to flow toward the top end face of the neck. At that time, a large difference in the resin flow state grows in the circumferential direction of the neck, depending on the layout of screw threads on the outer surface of the round neck wall, including the position of a starting portion or an ending portion of each screw thread, the number of screw thread rows that are in parallel, and the like.

The temperature of the resin goes down in the vicinity of the top end face of the round neck wall because the flow is coming close to an end in this portion. The differences in the pressure state and in the molecular orientation grow large under the effect of the flow state. Because the resin is in the final stage of flow, with subsequent clamping and cooling processes waiting, there is only a short period available for the molecular orientation to be absorbed. Therefore, in the molded product, there remains a difference in the state of molecular orientation that has occurred during the flow. This state of remaining molecular orientation is likely to cause a large difference in the degree of shrinkage in the thermal crystallization behavior.

In a first exemplary embodiment, the starting extension is disposed above the ending extension, in which the large-size portion of the starting extension is disposed above the small-size head of the ending extension, and the small-size head of the starting extension is disposed above the large-size portion of the ending extension. Thus, the starting extension and the ending extension are complementary to each other in their positions.

Due to the mutual complementation of vertical unevenness, the flow state of molten PET can be equalized in the circumferential direction of the neck including the starting and ending extensions. As a result, the degree of oriented crystallization can be made uniform, and thus the sinks caused by thermal crystallization can be controlled effectively in the top end face of the neck.

A second exemplary embodiment includes the configuration of the first embodiment and also comprises that the starting extension and the ending extension are formed, with width and height thereof being reduced gradually at the same, roughly constant rates from the start point and the end point of the main thread.

In the second embodiment, the starting and ending extensions are formed, with dimensions reduced gradually at the same, roughly constant rates from those of the main thread measured at the start point and the end point of the main thread, but in the direction opposite to each other. The two extensions have the same structure except that the directions are opposite. Therefore, the extent of unevenness obtained from complementary positions of extensions is roughly equivalent to that obtained from the main threads of screw threads.

A third exemplary embodiment includes the configuration of the first or second embodiments and also comprises that the neck has a multi-threaded spiral structure of screw threads in a number of n, with n being 2 or a larger integer, wherein main thread zones amounting to the number of n are formed in a central angle range of a little less than 360°/n, in which zones the main threads of at least two screw threads are disposed obliquely in parallel, with one main thread laid above the other, and wherein each thread extension zone is formed between two of said main thread zones that are equally spaced around the neck, with the starting extension of at least one screw thread being disposed above the ending extension of another screw thread in these thread extension zones.

In the third embodiment, the main thread zones amounting to the number of n are formed in a central angle range of a little less than 360°/n, and the main threads of at least two screw threads are disposed obliquely in parallel, with one thread laid above the other, in these main thread zones. Therefore, the central angle range of a thread extension zone is calculated by:

[(360°/n)−(the central angle range of a main thread zone)]

This makes it possible to set the central angle range of the thread extension zone and to set a short length for the starting extension and the ending extension properly.

The four exemplary embodiment includes the configuration of the first, second or third embodiment, and also comprises forming a groove in the outer surface of a round neck wall in the circumferential direction at a height above the screw threads, at a specified central angle position, and in a specified central angle range to protect the neck against sinks, which tend to develop in the top end face of the round neck wall under the effect of thermal crystallization treatment, and then whitening the neck by the thermal crystallization treatment.

The configuration concerning the groove of the fourth embodiment is added, if necessary, to the configuration concerning the positions of the starting extension and the ending extension of each screw thread according to the first to third embodiments, where the starting extension is vertically disposed above the ending extension. This groove configuration is aimed at effectively controlling the sinks caused by thermal crystallization in the top end face of the neck.

In the fourth embodiment, a peripheral groove or groove segments are formed in the upper portion of the outer neck wall in the circumferential direction, at a height above the screw threads, at a specified central angle position, and in a specified central angle range while consideration is given to the layout of the screw threads. The entire flow of resin can be adjusted by narrowing the resin flow passage at the circumferential positions where the groove is formed. Because of this adjustment, it is possible to reduce the differences in the flow state in the circumferential direction and in the state of molecular orientation and to control effectively the occurrence of sinks that develop in the top end face of the neck due to the thermal crystallization treatment.

The groove formed in the round neck wall can be effective even if it is about 1/10 as deep as the wall thickness. The groove serves to prevent the sinks from occurring, within the limit that no damage is given to the seal formed between a portion of outer surface right under the top end face of the round neck wall and the upper portion of the inside wall of a screw cap. In addition, the groove can be made inconspicuous in its external appearance.

It is likely that this groove has the above-described action and effect because the groove is placed above the screw threads and in close vicinity of the end of resin flow where the resin has a considerably low temperature and a high viscosity. Under these conditions, it is fully possible to adjust the state of molecular orientation merely by changing the slight depth of the flow passage.

An optimum shape of the groove can be basically determined from experiments by checking on the extent of sinks.

The groove can be variously formed by changing such factors as the number of groove or grooves, the height at which the groove is disposed laterally, circumferential position and range, groove depth, and groove width.

The means of carrying out the fifth exemplary embodiment comprises that the groove of the fourth embodiment is formed around the neck as intermittent groove segments.

Under the configuration of the fifth embodiment, the groove can be formed intermittently as groove segments, depending on the observed state of sink occurrence. Thus, the flow state is adjusted by simple-shaped groove segments in the circumferential direction so that the sinks can be controlled effectively.

The sixth exemplary embodiment includes the configuration of the third embodiment, and also comprises that the groove is formed as peripheral groove segments around the neck in the outer neck wall at the height above screw threads, except in the thread extension zones, to control the sinks caused by thermal crystallization in the top end face of the neck.

In the sixth embodiment, the groove is formed around the neck, except in the thread extension zones where molten resin flow passages undergo a larger change than in the main thread zones. If the width of resin flow is narrowed in the area where the groove has been formed, then the effect of the change in the resin flow state of the thread extension zones can be adjusted at the time of injection molding of the preform. Thus, the sinks can be controlled effectively when the groove is combined with the configuration of the starting and ending extensions that are disposed vertically with one above the other.

The seventh exemplary embodiment includes the configuration of the first, second, third, fourth, fifth or sixth embodiments, and also comprises that a bead ring is disposed on the outer surface of the round neck wall right under the threaded area and is used to fit a pilfer-proof cap made of a synthetic resin.

In the seventh embodiment, a bead ring is formed so that a pilfer-proof cap made of a synthetic resin can be fitted to the neck by means of this bead ring. In addition, the effect of screw threads on the molecular orientation can be softened to some extent by forming the bead ring.

The eighth exemplary embodiment includes the seventh embodiment, and also comprises that a bead ring and a neck ring are disposed in the lower portion of the neck below the screw threads and that the neck including these bead ring and neck ring is whitened by the thermal crystallization treatment.

In the eighth embodiment, the bead ring and the neck ring are disposed, if necessary, in the lower portion of the neck, and the neck including these rings is whitened by thermal crystallization. Because of these bead ring and neck ring, relatively thick portions are formed peripherally in the lower portion of the neck, and can be used to soften the effect of screw threads on the resin flow to some extent.

Effects of the Invention

The above-described configuration has the following effects: Due to the mutual complementation of unevenness, the first embodiment enables the flow state of molten PET to be equalized in the circumferential direction of the neck including the starting and ending extensions. As a result, the degree of crystallization can be made uniform, and thus the sinks caused by thermal crystallization can be controlled effectively in the top end face of the neck. The first embodiment also enables the neck to have a strong and stable sealing property.

In the second embodiment, an improved extent of unevenness is obtained by the positional complementation between the starting extension and the ending extension, in which the former is disposed vertically above the latter. Since the extent of this complemented unevenness is almost equivalent to the extent of unevenness obtained from the main screw threads, the molecular orientation state can be uniformly distributed over the entire periphery of the neck. Therefore, a sufficient preventive effect against sinks can be obtained from complemented unevenness.

In the third embodiment, it becomes possible to set a central angle range suitably in the thread extension zone, where the starting extension is disposed above the ending extension, and thereby, to set a suitable length for both of the starting and ending extensions so that the entire multi-threaded screw structure can be simplified. For example, if the main thread zones are formed in a central angle range of a little less than $360°/n$, then it is possible to reduce the central angle range of the thread extension zone and to set a short length for the starting extension and the ending extension, which are disposed vertically with one extension above the other.

In the fourth embodiment, the resin flow state is adjusted by forming the groove in the circumferential direction at a specified position and in a central angle range. Coupled with the configuration concerning the positions of the starting and ending extensions of screw threads, with the starting extension being disposed above the ending extension, this adjustment serves to reduce the differences in both of the state of the flow in the circumferential direction and the molecular orientation state. Thus, the sinks caused by the thermal crystallization treatment can be prevented effectively from developing in the top end face of the neck.

In the fifth embodiment, the groove can be formed intermittently as groove segments, depending on the observed state of sink occurrence. Thus, the state of flow in the circumferential direction is adjusted effectively by the groove segments in a simple shape.

In the sixth embodiment, the resin flow state in the thread extension zones can be adjusted so as to offset the effect of changes in the resin flow and to control the sinks effectively.

In the seventh embodiment, the pilfer-proof cap made of a synthetic resin can be fitted to the neck, and the effect of screw threads on the molecular orientation crystallization can be reduced to some extent. Therefore, the controlling effect against sinks can be further increased.

In the eighth embodiment, the sinks can be more effectively controlled because the bead ring and the neck ring are used to soften the effect of screw threads on the resin flow to some extent.

EXPLANATION OF CODES

Figure 1:
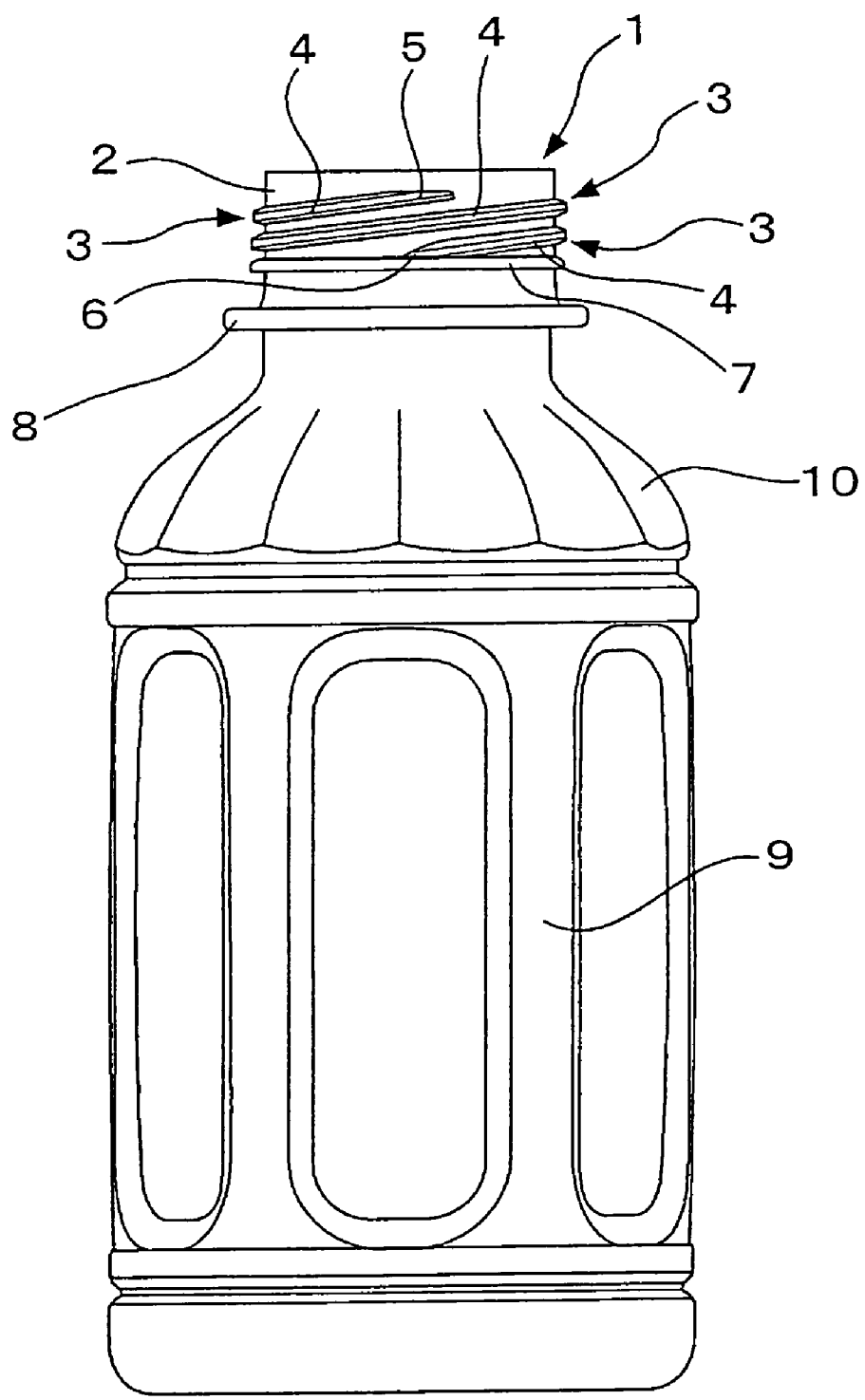
FIG. 1 is a front elevational view of the bottle adopted in one embodiment of this invention.
Figure 2:
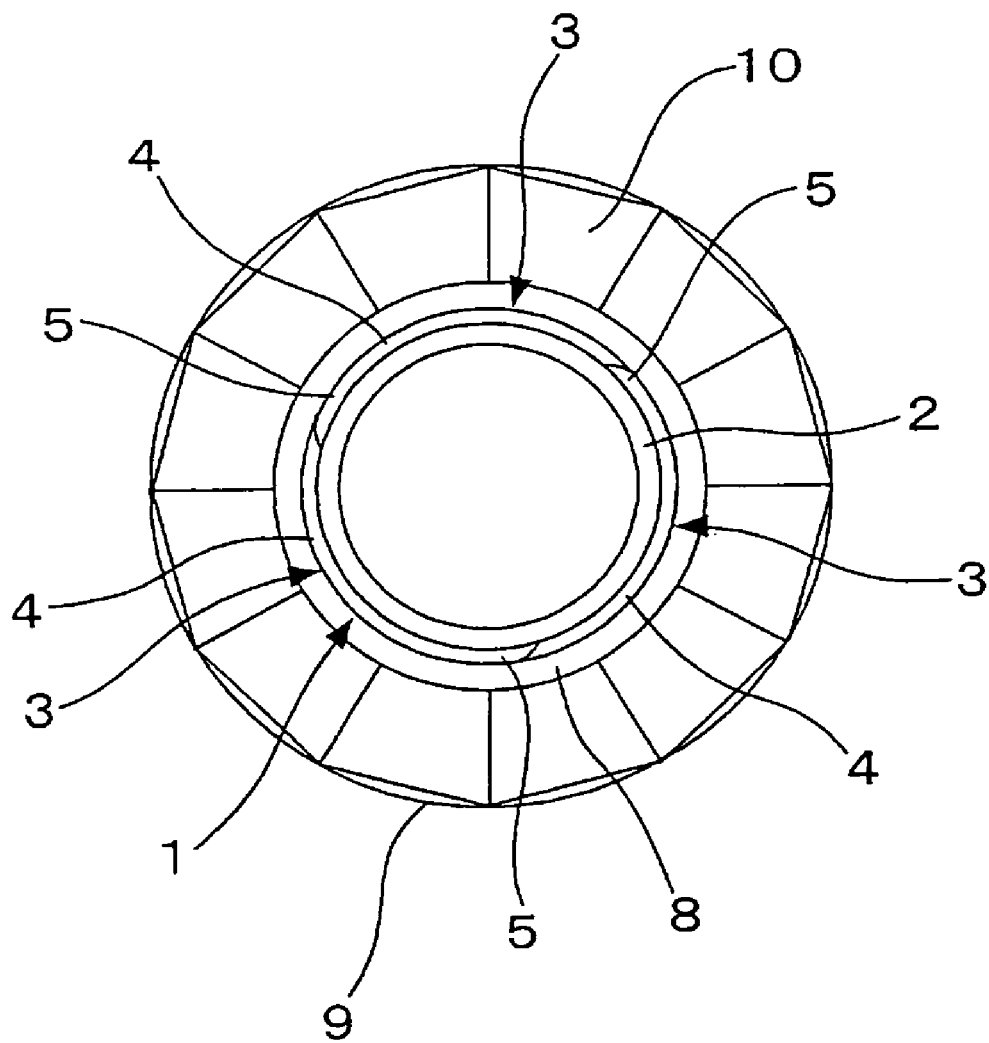
FIG. 2 is a plan view of the embodiment shown in FIG. 1.

1; neck
2; Round neck wall
3; Screw thread
4; Main thread
5; Starting extension
6; Ending extension
7; Bead ring
8; Neck ring
9; Body
10; Shoulder
11; Groove
12; Groove-missing portion
30; Screw thread
40 Main thread
50; Starting portion
60; Ending portion
a; Main thread start point
b; Main thread end point
c; Position
d; Position
e; Position
f; Main thread zone
g; Thread extension zone
h; Sink

PREFERRED EMBODIMENTS OF THE INVENTION

This invention is further described with respect to preferred embodiments, now referring to the drawings. FIGS. 1-7 describe the neck in the first embodiment of this invention. FIG. 1 is a front elevational view of an entire bottle having the neck in the first embodiment of this invention. The bottle is a biaxially drawn, blow molded PET bottle, which comprises a body 9 having a bottomed cylindrical shape, a shoulder 10 having a truncated dodecagonal cone shape, which is disposed at the upper end of the body 9, and a neck 1 according to this invention, which stands upright from the shoulder 10.

The neck 1 has multiple screw threads 3 (three threads in the embodiment shown in FIG. 1) of a continuous, multi-threaded screw structure disposed on the upper half of the outer surface of a round neck wall 2. Right under this multi-threaded structure there is a bead ring 7 exclusively used together with a pilfer-proof cap made of a synthetic resin. This bead ring 7 is short in height and is not connected to the screw threads 3. A neck ring 8 serving as a support ring is disposed at the lower end of the outer surface of the round neck wall 2.

Figure 3:
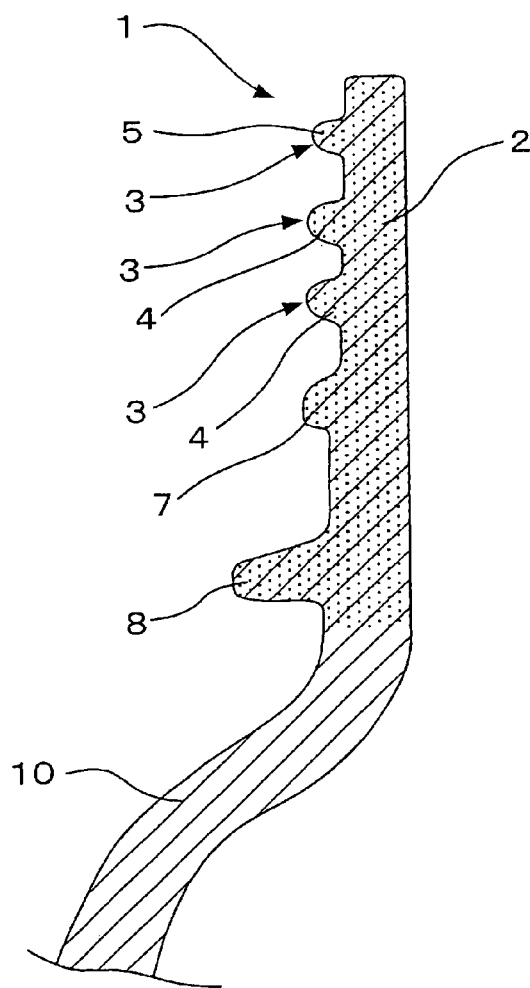
FIG. 3 is an enlarged vertical section of an important part of the embodiment shown in FIG. 1.

The neck 1 including the neck ring 8 is entirely whitened by thermal crystallization (See FIG. 3). This thermal crystallization treatment is not limited to the neck 1 only. As shown in FIG. 3 of this embodiment, thermal crystallization can also be applied to the upper end portion of neck base, which denotes a portion connecting the neck 1 to the shoulder 10. In some cases, roughly entire portion of the neck base can be thermally crystallized to a low degree of crystallization.

Each screw thread 3 comprises the main thread 4 that primarily carries out the screwing function, the starting extension 5 and the ending extension 6 that extend from the start point (a) and the end point (b) of each main thread 4, with width and height being reduced gradually at the same constant rates from those of the main thread 4. The ending extension 6 has the identical structure with the starting extension 5, but faces the direction opposite thereto.

Figure 4:
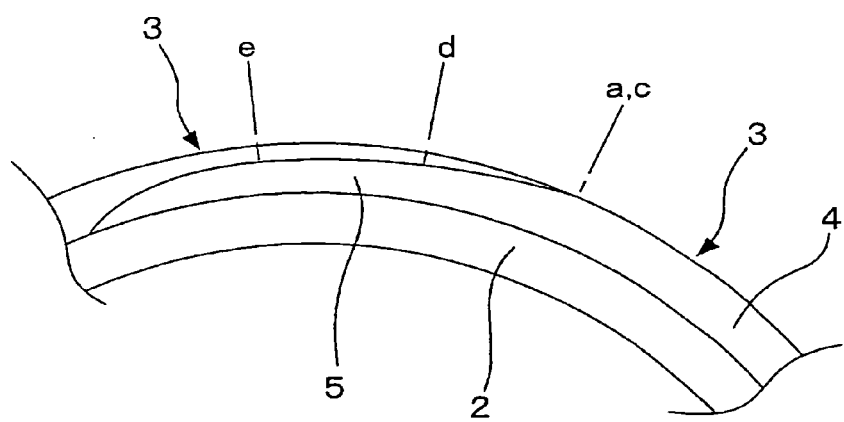
FIG. 4 is an enlarged plan view of an important part of the embodiment shown in FIG. 2.
Figure 5:
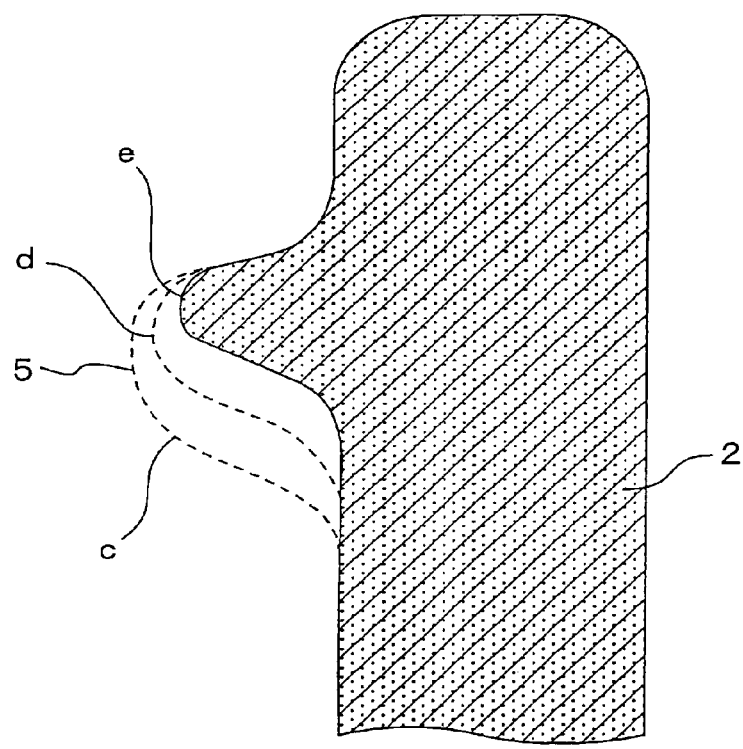
FIG. 5 is an enlarged vertical section of an important part of the embodiment shown in FIG. 4, cut vertically at the position (e).

As shown in FIGS. 4 and 5, the starting extension 5 has a structure in which its width and height are reduced gradually at the same, roughly constant rates as those of the ending extension 6, as the starting extension 5 extends from the position (c), which is the same point as the start point (a) of the main thread, through positions (d) and (e) toward the tip. The ending extension 6 has the same structure but is only in the direction opposite the starting extension 5.

Each screw thread 3 is formed in a central angle range of 280°. Within this range, the main thread 4 covers a range of 200°, and the starting/ending extensions 5 and 6 cover a range of 40° respectively.

Figure 6:
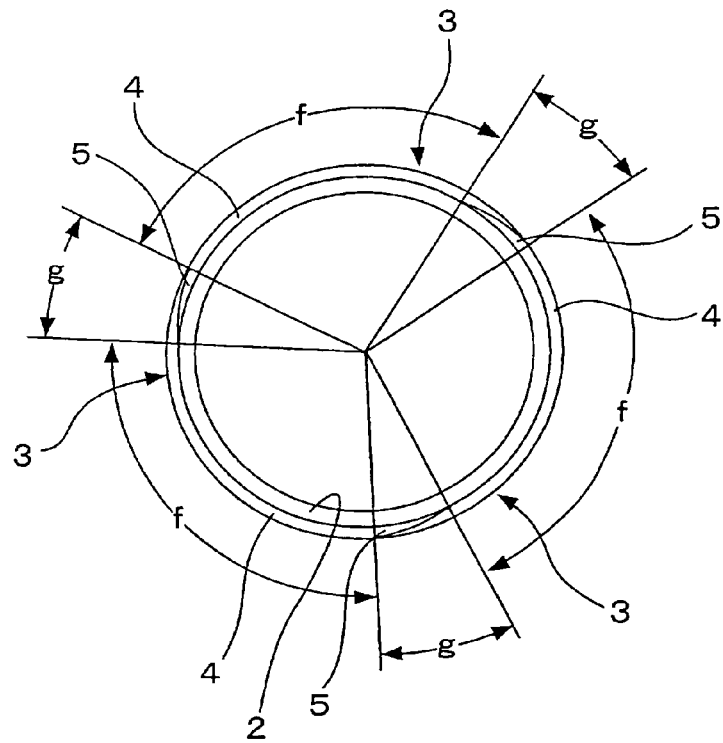
FIG. 6 is an explanatory plan view showing the relationship between main thread zones and thread extension zones of the neck shown in FIG. 1.
Figure 7:
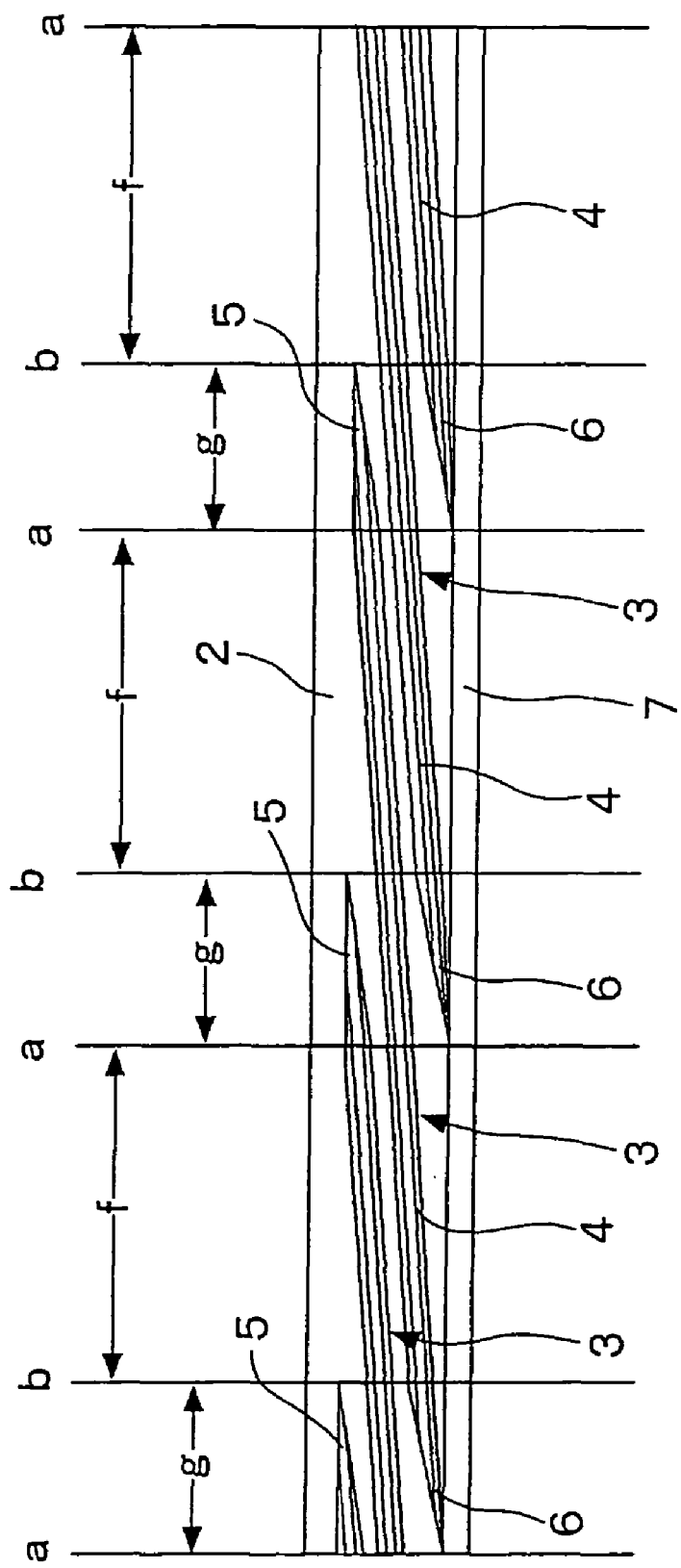
FIG. 7 is an explanatory diagram of the neck shown in FIG. 6, which has been rolled out.

As shown in FIGS. 6 and 7, under the spiral structure of screw threads 3 formed on the neck 1, there are formed the main thread zones (f) in which a part of a main thread 4 is disposed above a part of a main thread of another screw thread 3 and the thread extension zones (g) in which a starting extension 5 of a screw thread 3 is disposed above an ending extension 6 of still another screw thread 3.

A screw thread 3 is intertwined with two other screw threads 3 in the spiral structure. All in all, three main thread zones (f) are formed, with each zone (f) having a central angle range of 80°.

A thread extension zone (g) comprises a starting extension 5 of a screw thread 3, a part of the main thread 4 of a neighboring screw thread 3, and an ending extension 6 of another neighboring screw thread 3. Structurally, the starting extension 5 is disposed above the portion of the main thread of a neighboring screw thread 3, and this portion of the main thread 4 is disposed above the ending extension 6. Each thread extension zone (g) is disposed between two main thread zones (f) and has a central angle range of 40°.

As described above, the starting extension 5 and the ending extension 6 in a thread extension zone (g) has the same structure with an exception that the two extensions are opposite to each other in their direction. Since the width and height of these extensions are gradually reduced at the same, roughly constant rates, the combination of the starting and ending extensions is disposed vertically at the position of one above the other, and the two extensions are in a mutually complementary relationship as far as uneven height is concerned.

More specifically, the extent of unevenness resulted from a main thread 4 can be achieved to a roughly equivalent level by a combination of the starting and ending extensions 5 and 6 in this thread extension zone (g), in which the starting extension is disposed above the ending extension.

Therefore, a combination of a starting extension 5, a main thread 4, and an ending extension 6 is formed in each thread extension zone (g), and the extent of vertically observed unevenness in the thread extension zone (g) becomes roughly equal to the extent of unevenness developed by two main threads 4 in the main thread zone (f).

Thus, the main thread zone (f) and the thread extension zone (g) are roughly equivalent to each other in the extent of vertical unevenness brought about by the screw threads 3. As a result, the two zones are also a good match in the degree of the molecular orientation of the PET material. Therefore, the sinks (h) can be prevented stably from developing in the top end face of the round neck wall 2.

In the first embodiment shown in the drawings, the starting extensions 5 and the ending extensions 6 of the screw threads 3 have a length corresponding to the same central angle as the range of a thread extension zone (g) formed between the start point (a) of a main thread and the end point (b) of another main thread. The length of extensions is not necessarily limited to such a length, but a length slightly exceeding this central angle of the thread extension zone (g) is allowed.

The neck 1 of the first embodiment shown in the drawings is 20 mm high and 38 mm in diameter, and is provided with three screw threads in the spiral structure although the multi-threaded screw structure is not specified to three screw threads. If the bottle needs to have a larger diameter than 38 mm, while keeping the height at 20 mm, then the number of screw threads can be adequately increased to more than three in response to the widened diameter.

Figure 8:
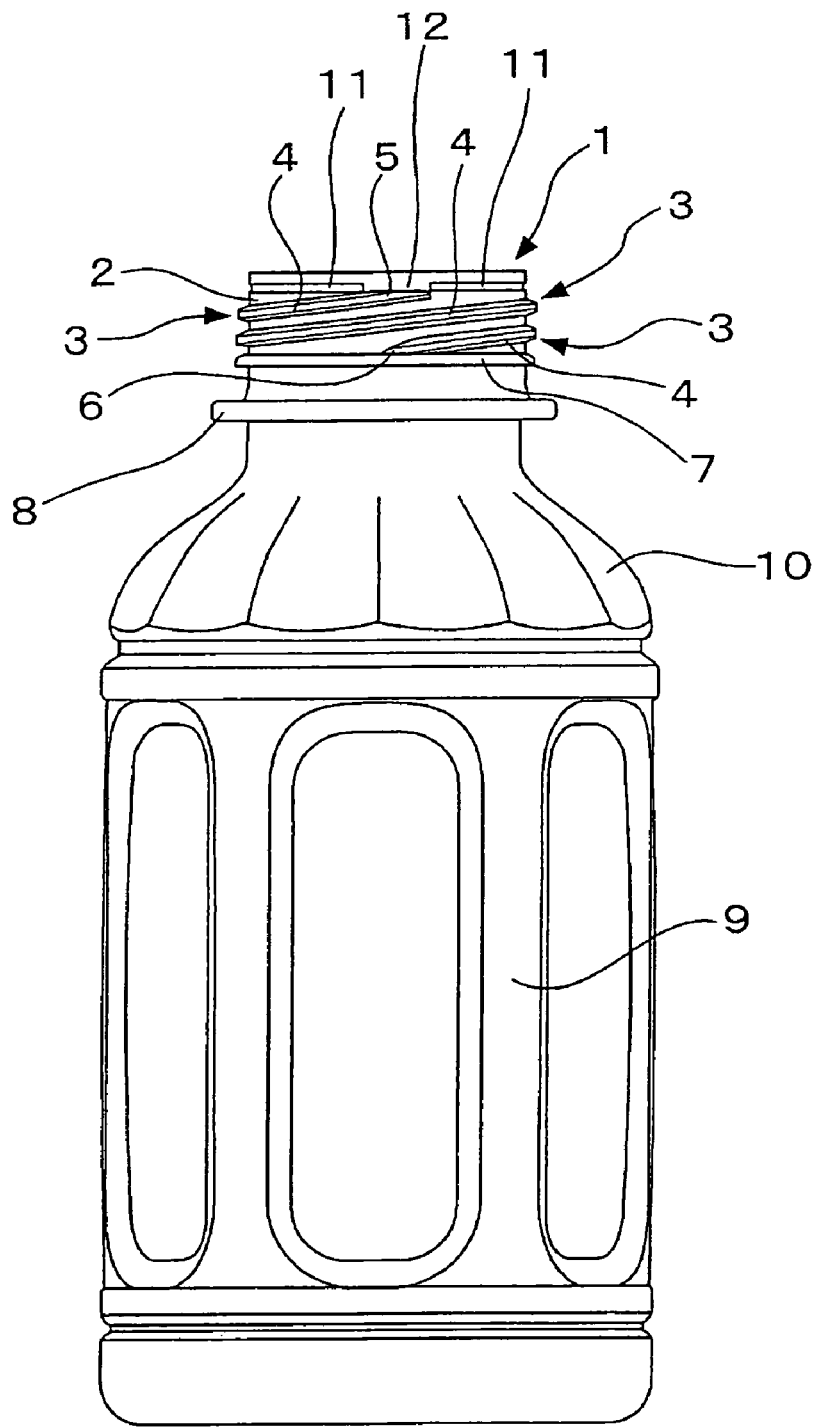
FIG. 8 is a front elevational view of a bottle with the neck adopted in the second embodiment of this invention
Figure 9:
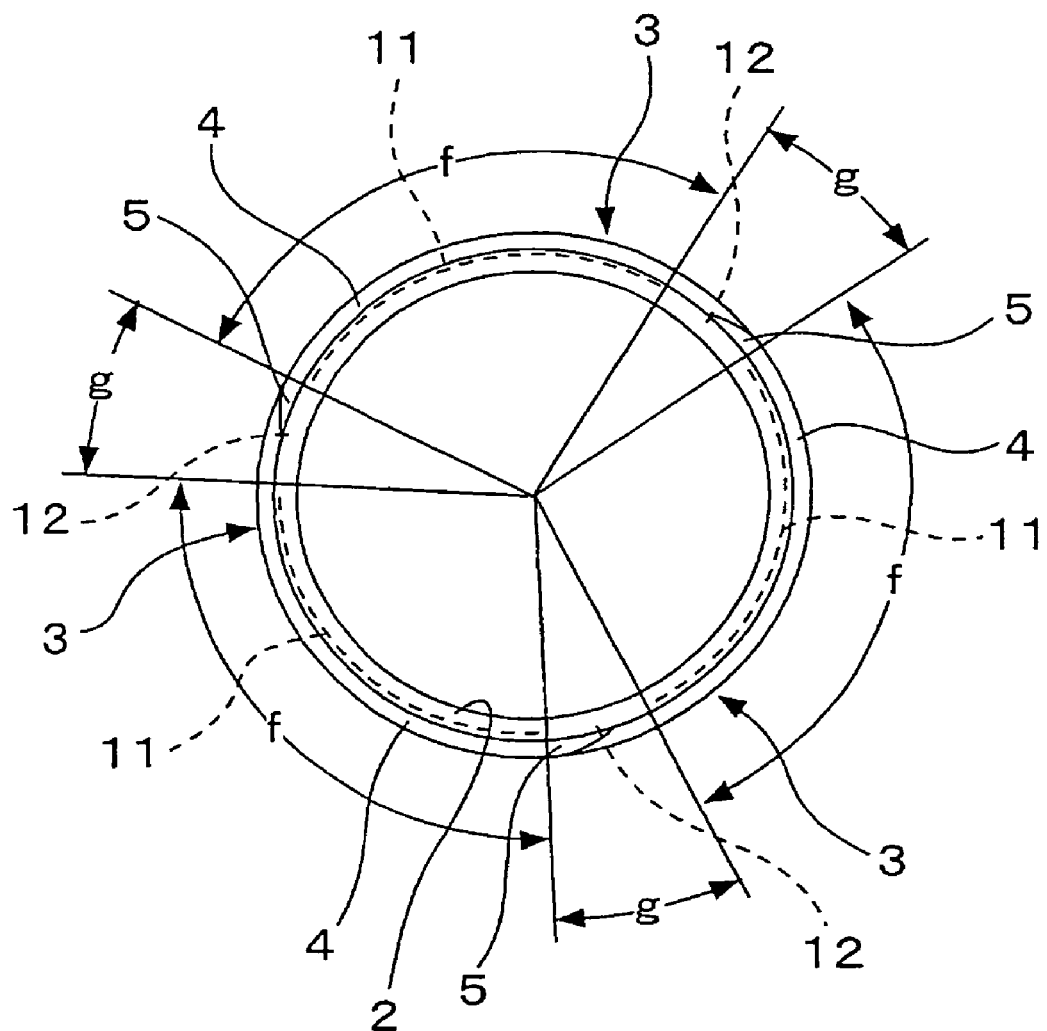
FIG. 9 is an explanatory plan view showing the positional relationship among the main thread zones, the thread extension zones, and the groove of the neck shown in FIG. 8.
Figure 10:
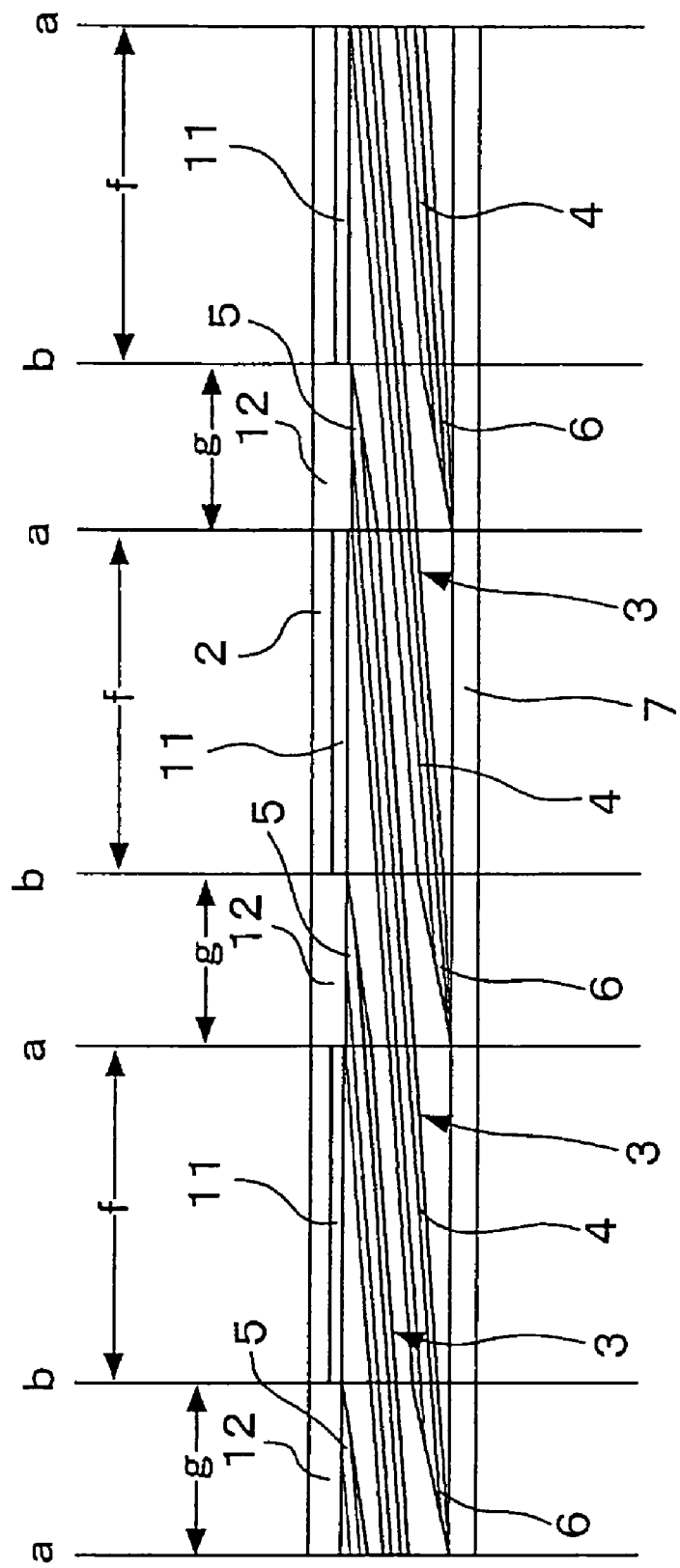
FIG. 10 is an explanatory diagram of the neck shown in FIG. 9, which has been rolled out.

FIGS. 8-10 show the neck in the second embodiment of this invention. FIG. 8 is a front elevational view of an entire bottle with the neck in the second embodiment of this invention. FIG. 9 is an explanatory plan view showing the positional relationship among the main thread zones (f), the thread extension zones (g), and the groove 11 of the neck 1. FIG. 10 is an explanatory diagram shown in FIG. 9, which has been rolled out. The neck 1 in the second embodiment has the same shape as the neck in the first embodiment including the multi-threaded screw structure, except that the peripheral groove 11 is formed intermittently at positions right above the screw threads on the outer surface of the round neck wall 2.

Groove-missing portions 12 are disposed in three thread extension zones (g). Except in these groove-missing portions 12, the groove 11 is formed intermittently as groove segments (See FIGS. 8 and 9). In this embodiment, the groove 11 is about 1/10 as deep as the thickness of the round neck wall 2.

The layout of the groove-missing portions 12 can be determined from experiments by observing the positions (See FIG. 11) of sinks that have occurred in the neck 1 having no groove 11 and correlating the positions of sinks with the layout of screw threads 3, while giving consideration to the resin flow state.

Figure 11:
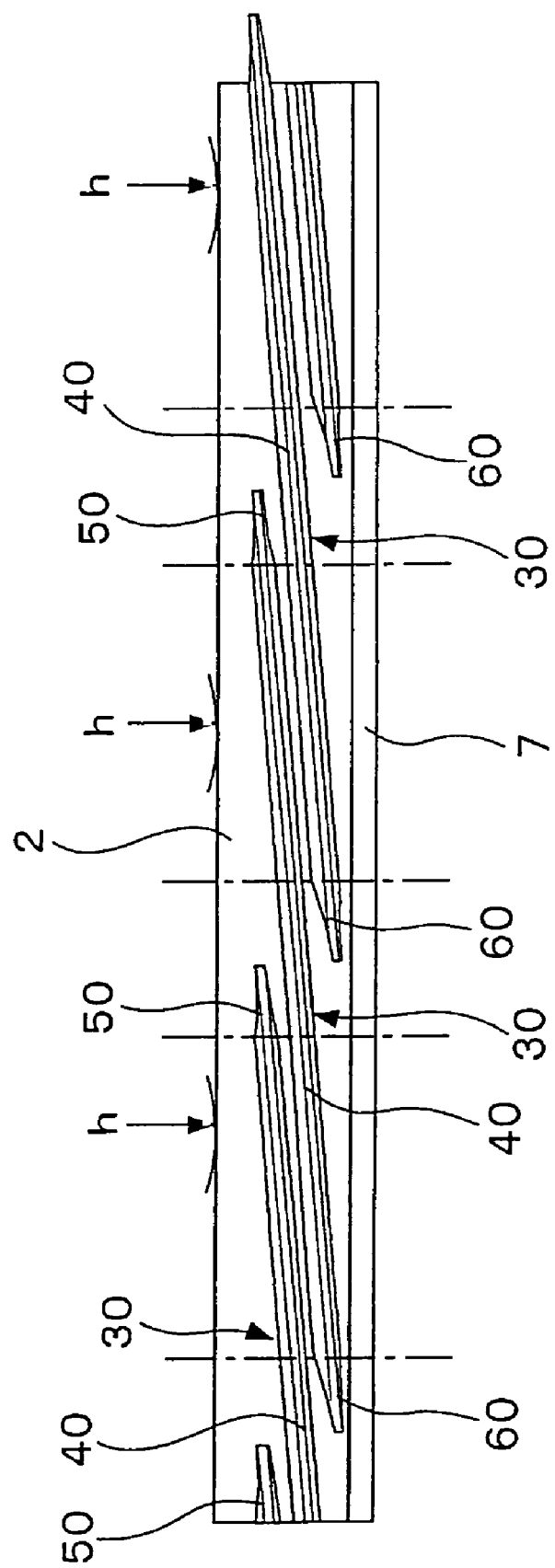
FIG. 11 is an explanatory diagram showing the rolled-out screw threads in a multi-threaded screw structure found in conventional art.

In this embodiment, the groove 11 is formed intermittently as peripheral groove segments, and the groove-missing portions 12 are disposed correspondingly, taking into consideration that the sinks (h) frequently develop at the central angle position in the range of 20 to 40 degrees toward the screwing direction from the main thread start points (a) of respective screw threads 3, as shown in FIG. 11.

In other words, it has been attempted to adjust the entire resin flow by means of the groove 11 to narrow the resin flow in the portions other than the groove-missing portions 12 in the vicinity of the end of resin flow. The sinks are prevented from occurring by forming the groove 11 intermittently as peripheral groove segments.

The resin flow exhibits complicated behavior in the vicinity of the top end face of the neck during the time when preform is being injection molded. Although mechanism is not yet clear, the sinks occur frequently in the neck, as shown in FIG. 11, at three points determined by a central angle position in the range of 20 to 40 degrees from respective main thread start points (a). However, it has been found that the behavior of resin flow or crystallization can be adjusted by the groove 11 at the end of the resin flow, even in the case of a groove 11 about 1/10 as deep as the thickness of the round neck wall 2. As practiced in this embodiment, this can be done simply by correlating the positions of sinks with the layout of screw threads 3 and by changing the shape of the groove 11 accordingly.

The groove can be utilized as a means of adjusting the resin flow state in various manner. Not only the position of the groove, but also the groove depth and width can also be changed as long as the groove does not give damage to the sealing property that should be established between the upper portion on the outer surface of the round neck wall and the screw cap. In addition, plural peripheral grooves can be disposed around the neck. If necessary, the groove configuration can be combined with the configuration concerning the positions of the starting extension and the ending extension of each screw thread, in which the starting extension is vertically disposed above the ending extension.

INDUSTRIAL APPLICABILITY

As described above, the neck of this invention effectively controls the sinks caused by the thermal crystallization treatment in the top end face of the neck. The neck of this invention is applicable to the retort-packed foods, which necessitate thermal crystallization treatment conducted at a high temperature of about 180° C., and is expected to have a wide range of uses.

The invention claimed is:

1. A neck of a synthetic resin bottle comprising:
   a round neck wall; and
   a screw structure comprising screw threads disposed on an outer surface of the round neck wall, each of the screw threads comprising:
      a main portion;
      a starting extension extending from a start point of the main portion, a width and a height of the starting extension being reduced gradually from dimensions of the main portion; and
      an ending extension extending from an end point of the main portion, a width and a height of the ending extension being reduced gradually from the dimensions of the main portion, the ending extension having a same length as the starting extension;
   wherein:
      the starting extension of each of the screw threads is vertically disposed on the neck wall above the ending extension of another screw thread of the screw threads; and
      the neck is entirely whitened by a thermal crystalline treatment.

2. The neck of the synthetic resin bottle according to claim 1 wherein the starting extension and the ending extension are formed by reducing the width and height gradually a same, roughly constant rate from the start point of the main portion and the end point of the main portion.

3. The neck of the synthetic resin bottle according to claim 1 wherein the neck has the screw structure comprising a number n of the screw threads, with n being 2 or a larger integer, wherein main thread zones amounting to the number of n are formed in a central angle range of a little less than 360°/n, in the main thread zones, rows of main portions of at least two screw threads are disposed obliquely in parallel, with a first main portion laid above a second main portion, and wherein thread extension zones are formed between each of the main thread zones that are equally spaced around the neck, with the starting extension of at least one of the screw threads being disposed above the ending extension of another screw thread in each thread extension zone.

4. The neck of the synthetic resin bottle according to claim 3 wherein a groove is formed peripherally in portions other than the thread extension zones and is disposed in the outer surface of the round neck wall at a height above the screw threads to control sinks caused by the thermal crystallization treatment.

5. The neck of the synthetic resin bottle according to claim 1 wherein a groove is formed in the outer surface of the round neck wall in a circumferential direction and disposed at a height above the screw threads, at a specified central angle position, and in a specified central angle range to prevent an occurrence of sinks, which tend to develop in a top end face of the round neck wall due to the thermal crystallization treatment.

6. The neck of the synthetic resin bottle according to claim 5, wherein the groove is formed around the neck as intermittent groove segments.

7. The neck of the synthetic resin bottle according to claim 1 wherein a bead ring is disposed on the outer surface of the round neck wall right under the screw threads and is used to fit a pilfer-proof cap made of a synthetic resin.

8. The neck of the synthetic resin bottle according to claim 7 wherein the neck is of a structure in which a neck ring is disposed below the bead ring and wherein the bead ring and the neck ring are whitened by the thermal crystallization treatment.

* * * * *

UNITED STATES PATENT AND TRADEMARK OFFICE
CERTIFICATE OF CORRECTION

PATENT NO. : 7,735,663 B2
APPLICATION NO. : 10/579496
DATED : June 15, 2010
INVENTOR(S) : Toshimasa Tanaka et al.

It is certified that error appears in the above-identified patent and that said Letters Patent is hereby corrected as shown below:

At column 4, line 20, change "four" to --fourth--

At column 10, line 52, change "gradually a same" to --gradually at a same--

Signed and Sealed this

Fourteenth Day of September, 2010

David J. Kappos
*Director of the United States Patent and Trademark Office*